No. 691,523. Patented Jan. 21, 1902.
J. R. BATE.
MACHINE FOR MAKING EXCELSIOR.
(Application filed Oct. 26, 1901.)
(No Model.) 3 Sheets—Sheet 1.

WITNESSES:— INVENTOR:—

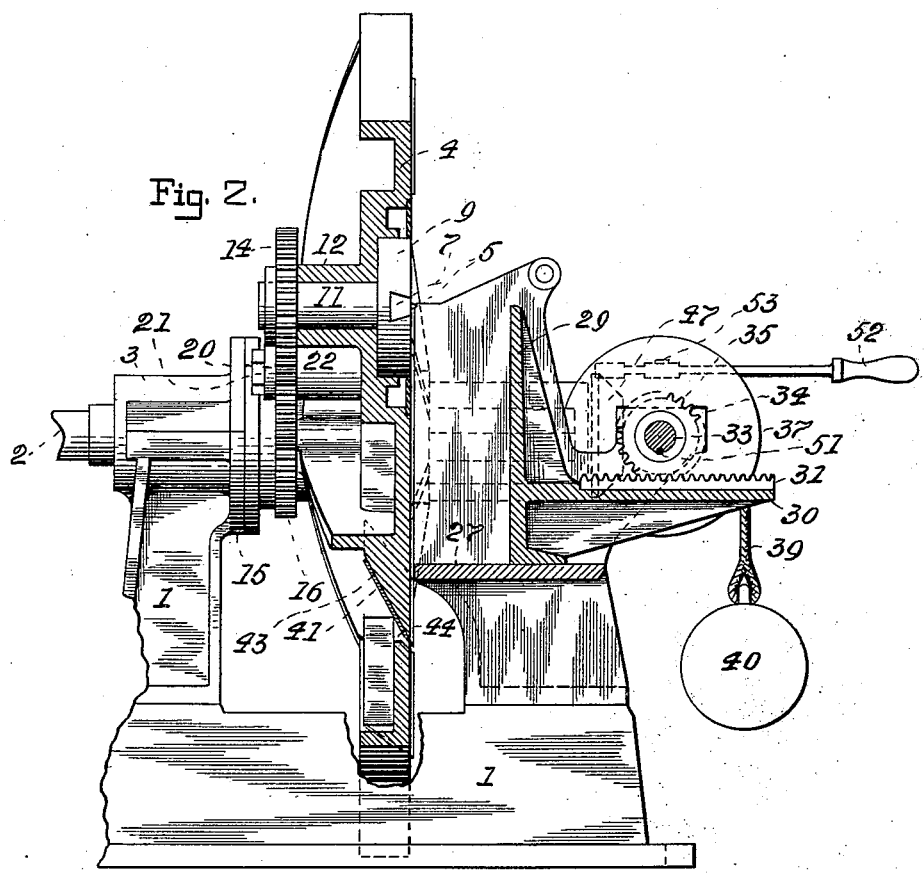

No. 691,523. Patented Jan. 21, 1902.
J. R. BATE.
MACHINE FOR MAKING EXCELSIOR.
(Application filed Oct. 26, 1901.)

(No Model.) 3 Sheets—Sheet 3.

WITNESSES: INVENTOR:

UNITED STATES PATENT OFFICE.

JAMES RUSSELL BATE, OF BALTIMORE, MARYLAND.

MACHINE FOR MAKING EXCELSIOR.

SPECIFICATION forming part of Letters Patent No. 691,523, dated January 21, 1902.

Application filed October 26, 1901. Serial No. 80,027. (No model.)

*To all whom it may concern:*

Be it known that I, JAMES RUSSELL BATE, of the city of Baltimore and State of Maryland, have invented certain Improvements in Machines for Making Excelsior, of which the following is a specification.

This invention relates to certain improvements in that class of machines for making excelsior in which a disk carrying scoring devices and slicing-knives is made to rotate against a log of wood which is fed toward the said disk and in contact with its cutting devices; and the said invention consists principally in novel means whereby a row of scoring-blades is retained in a horizontal position during the entire rotation of the said disk and moved radially of the same in order that the scores may be in straight vertical lines, as will hereinafter fully appear.

In the further description of the said invention which follows reference is made to the accompanying drawings, forming a part hereof, and in which—

Figure 1:
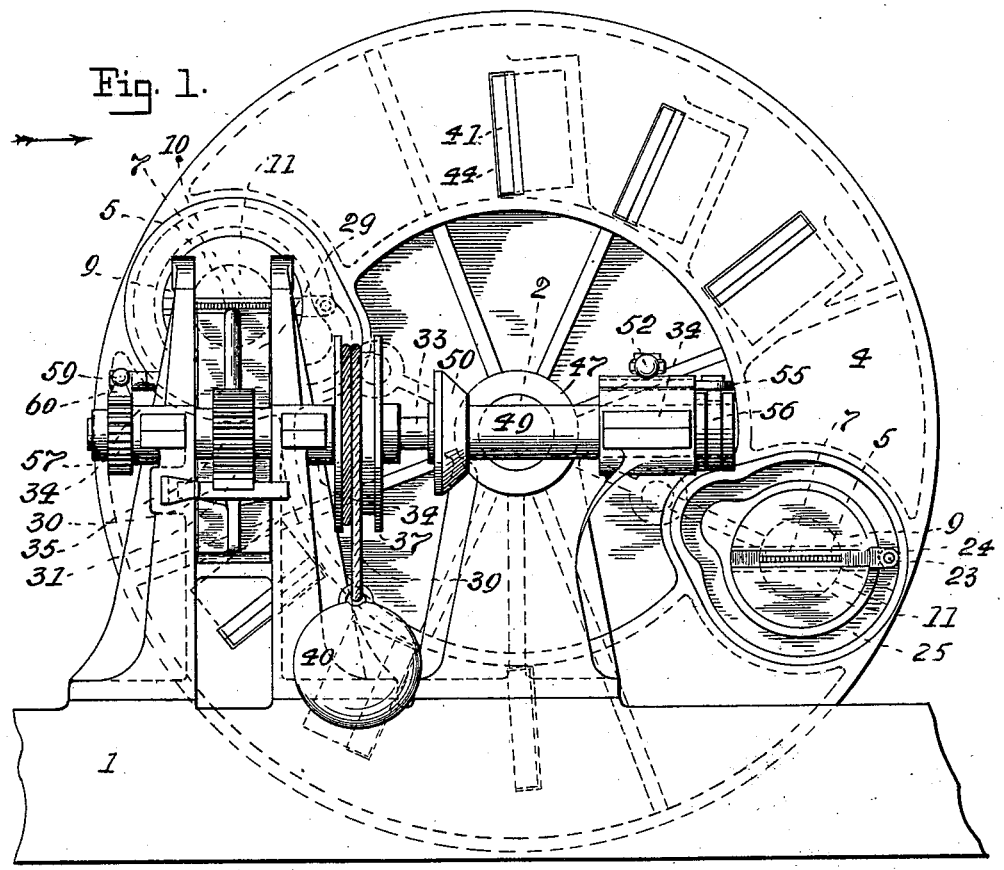
Figure 11:
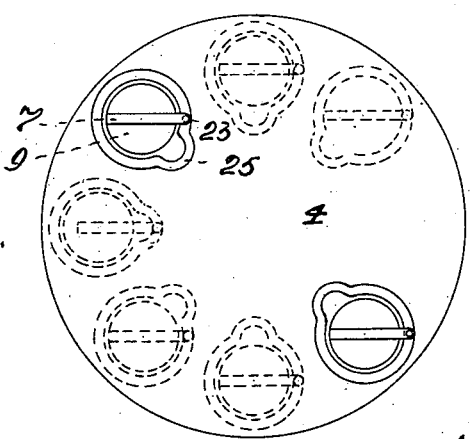
Figure 3:
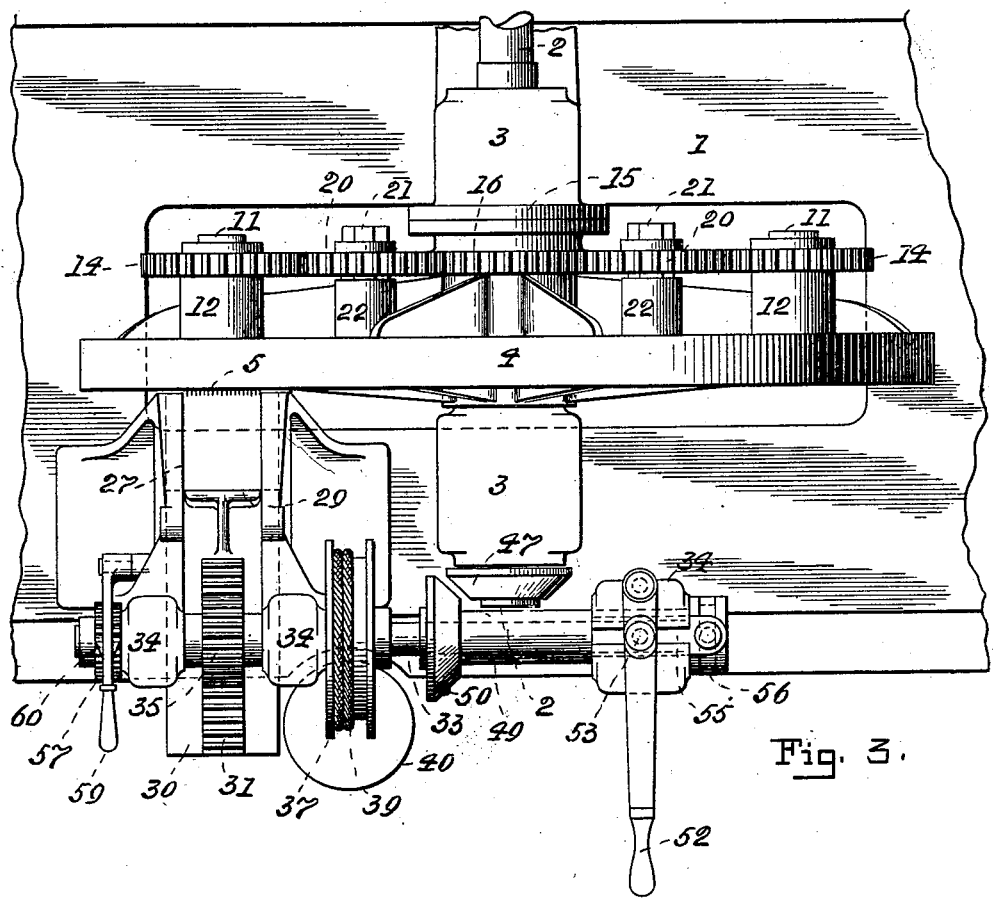

Figure 1 is a face view of the improved machine. Fig. 2 is a partly-sectional view of Fig. 1 looking in the direction indicated by the arrow. Fig. 3 is a top or plan view of the same. Figs. 4 to 10, inclusive, are details of the machine. Fig. 11 is a front view, on a reduced scale, of the rotary disk, illustrating the means whereby the scoring devices are moved radially of the disk while they are passing vertically of the face of the log.

Referring now to the drawings, 1 is the frame of the machine.

2 is the main and driving shaft, adapted to rotate in the bearings 3. The pulleys whereby the said shaft is rotated are not shown.

Secured to the main shaft 2 is a disk 4, carrying the scoring and slicing knives, hereinafter described.

Figure 4:
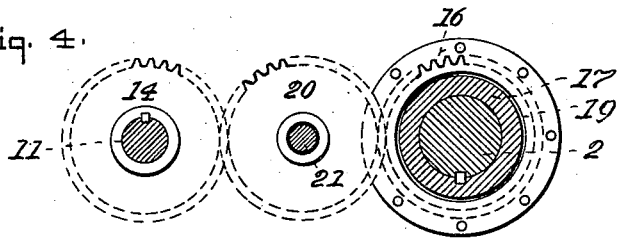
Figure 5:
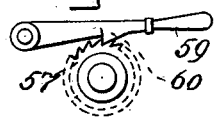
Figure 6:

The scoring devices consist each of a series of separated blades 5, projecting from a bar 7, adapted to slide longitudinally of a channel in a circular plate 9, seated in a circular recess in the face of the rotary disk 4. (See Figs. 9 and 10.) Each of these circular plates 9 has a shaft 11, which passes loosely through a suitable bearing 12, constituting a part of and situated on the rear side of the rotary disk 4, and to this shaft is fastened a spur gear-wheel 14. On the rear bearing 3 of the main shaft 2 is a flange 15, to which is bolted the flange of a stationary spur gear-wheel 16, a section of which is shown in Fig. 6, and it will be understood that the inner diameter of this wheel is such that the hub 17 of the rotary disk 4 (shown in Fig. 4) does not come in contact with it, there being an annular space 19 between the said hub and wheel, as shown in Fig. 4.

20 20 are idle spur gear-wheels loose on the studs 21, which studs project from the bosses 22, formed as parts of the rotary disk 4. The pitch-diameters of all the spur gear-wheels are the same. Consequently the circular plates 9 perform one complete rotation on their axis during each rotation of the disk 4, and the bars 7, carrying the scoring-blades 5, are therefore always on a horizontal plane.

In order that the scoring-blades may not describe an arc of a circle during the time that they are performing the work for which they are intended, each bar 7 at one end is provided with a pin 23, carrying a roller 24, which enters a cam-slot 25 in the face of the rotary disk 4. These cam-slots (see particularly Figs. 9, 10, and 11) are mainly circular; but on the side next to the center of the disk they are extended inward in a curved line, so that the rollers when entering this portion of the said slots are drawn toward the center of the disk until the scoring-blades reach the horizontal central line of the machine, when they begin to move outward and continue in this direction until they reach their original position and the scoring-blades have passed the lower edge of the log. The said blades thus describe vertical lines while passing across the log. The cam-slots are covered by plates 10, as shown particularly in Figs. 9 and 10.

27 is the bed for the log (not shown) from which excelsior is to be cut, and 29 the head-block which backs the log. To feed in the head-block which slides on the bed 27, that device is furnished with a bracket 30, having a toothed rack 31 on its upper side.

33 is a horizontal shaft supported in bearings 34 in front of the rotary disk 4. On this shaft is a tight pinion 35, the teeth of which are in mesh with the teeth of the rack 31. The said shaft is also provided with a tight pulley 37, around which is wound a rope 39, with a weight 40 at its end. The rope 39 is wound in such a direction on the pulley 37 that the weight 40 serves to move the head-block and the log toward the rotary disk 4.

41 41 are the slicing-knives, before briefly referred to, and they are secured to inclined surfaces 43, (see Fig. 8,) with their cutting edges projecting through slots 44 in the rotary disk 4.

The head-block 29 could be moved back by hand to admit of the placing of the log on the bed 27; but to mechanically perform this function the front end of the main shaft 2 is fitted with a tight beveled friction-wheel 47 and the shaft 33 with a sleeve 49, carrying a similar friction device. The sleeve slides on a feather 51. (Shown in Fig. 3.) To put in rotation the sleeve 49 and its friction-wheel 50, and thus effect the rotation of the pinion 35, a slotted hand-lever 52 is pivoted to a bearing 34 to the right of Fig. 3. This hand-lever couples with a pin 53, which passes through a slot in the upper end of the said bearing and projects from a link 55. This link is hinged or otherwise attached to a loose collar 56, seated in a groove in the sleeve 49. (See Figs. 3 and 7.) To draw back the sleeve 49 and bring the friction-wheel 50 into contact with the constantly-rotating friction-wheel 47, the hand-lever 52 is moved to the right. At the end of the shaft 33 is a tight ratchet-wheel 57, and to the frame 1 is pivoted a hand-lever 59, having a tooth 60, which engages with the teeth of the said ratchet-wheel. This pawl serves to retain the head-block in its outward position after the friction-wheels are separated in order that a log may be easily placed in position on the bed 27.

The operation of the machine is as follows: The disk 4 being in rotation and the head-block 29 held back by the engagement of the tooth 60 with the teeth of the ratchet-wheel 57, a suitable block or log of wood is placed on the bed 27. The lever 59 is then raised, which disconnects the tooth 60 from the ratchet-wheel 57 and allows the head-block to bear against the log and force it to the face of the rotating disk through the agency of the weight 40 and its connections. In the rotation of the said disk the scoring-blades make vertical cuts in the log to a depth considerably greater than the projection of the slicing-knives beyond the face of the rotating disk, and the wood removed by the said knives is in the form of ribbons, the proper shape of excelsior material. The operation as described is continued until the log is too thin for the purpose, when the hand-lever 52 is moved to the right, which brings into contact the friction-wheels 47 and 50, and the head-block is thereby carried back and locked. The old log is then removed and another placed in position, when the operation as described is repeated.

I claim as my invention—

1. In a machine for making excelsior, the combination with a rotary disk, of a shaft adapted to rotate in the said disk carrying scoring-blades, a gear-wheel secured to the said shaft, a fixed or stationary gear-wheel situated centrally of the rotary disk, and an idle gear-wheel in mesh with the other gear-wheels, whereby the scoring-knives are made to perform a single rotation for each rotation of the said disk, substantially as, and for the purpose specified.

2. In a machine for making excelsior, the combination with a rotary disk carrying slicing-knives, of a shaft adapted to rotate in the said disk and provided with a plate having a sliding bar with scoring-knives and a gear-wheel, means to reciprocate the said sliding bar, a fixed or stationary gear-wheel situated centrally of the said rotary disk, and an idle gear-wheel in mesh with the other gear-wheels, whereby the scoring-knives are made to perform a complete rotation for each rotation of the said disk and also to be carried vertically through a log placed in their path, substantially as, and for the purpose specified.

3. In a machine for making excelsior, the combination with a rotary disk carrying slicing-knives, of a shaft adapted to rotate in the said disk provided with a plate having therein a transverse slot, a bar with scoring-knives adapted to slide longitudinally of the said slot, a roller projecting from the said sliding bar, a cam which surrounds the said plate with which the said roller is in contact, a gear-wheel attached to and having a movement in common with the said plate, a fixed or stationary gear-wheel situated centrally of the said rotary disk, and an idle gear-wheel in mesh with the other wheels, substantially as, and for the purpose specified.

4. In a machine for making excelsior, the combination with a rotary disk carrying slicing-knives, of a shaft adapted to rotate in the said disk provided with a plate having therein a transverse slot, a bar furnished with scoring devices adapted to slide longitudinally of the said slot and having a projecting roller, a cam which surrounds the said shaft and plate with which the said roller is in contact, a gear-wheel having a movement in common with the said plate, a fixed or stationary gear-wheel situated centrally of the said rotary disk, and an idle gear-wheel in mesh with the other wheels, whereby the scoring-knives are made to retain a horizontal position and pass vertically through a log placed in their path, substantially as, and for the purpose specified.

JAMES RUSSELL BATE.

Witnesses:
OREGON MILTON DENNIS,
ESTEP T. GOTT.